United States Patent [19]

Marsh

[11] Patent Number: 4,625,987
[45] Date of Patent: Dec. 2, 1986

[54] SOFT TERRAIN MOTORCYCLE SUPPORT FIXTURE

[76] Inventor: Barry I. Marsh, 2309 Wood Beach Landing, Virginia Beach, Va. 23455

[21] Appl. No.: 769,651

[22] Filed: Aug. 27, 1985

[51] Int. Cl.⁴ .............................................. B62H 1/02
[52] U.S. Cl. ..................................... 280/293; 280/301
[58] Field of Search .................. 180/293, 295, 301; 254/418, 133 A

[56] References Cited

U.S. PATENT DOCUMENTS

| | | | |
|---|---|---|---|
| 3,712,640 | 1/1973 | Shipman et al. | 280/301 |
| 3,955,829 | 5/1976 | Bussler | 280/301 |
| 3,970,330 | 7/1976 | Norcross | 280/301 |
| 3,998,470 | 12/1976 | Houston | 280/301 |
| 4,474,387 | 10/1984 | Maranell | 280/293 |
| 4,521,031 | 6/1985 | Huth | 280/293 |

Primary Examiner—John J. Love
Assistant Examiner—Donn McGiehan
Attorney, Agent, or Firm—Griffin, Branigan & Butler

[57] ABSTRACT

A motorcycle side-stand accessory (10) enhances the effectiveness of a motorcycle side-stand (28) by allowing an operator to leave a motorcycle supported by the side stand on relatively soft terrain (24). The accessory comprises a thin, flat, steel, plate (12) to be placed under the side stand and a relatively long steel chain (14) attached to the metallic plate having an aluminum spring clasp (16) on its end for allowing the chain to be attached to a motorcycle foot peg (38), with the chain being relatively taut between the plate and the foot peg.

11 Claims, 2 Drawing Figures

SOFT TERRAIN MOTORCYCLE SUPPORT FIXTURE

BACKGROUND OF THE INVENTION

This invention relates generally to the art of motorcycles and, more particularly, it relates to the art of accessories for enhancing the effectiveness of motorcycle side, "kick", stands.

The ineffectiveness of side, "kick", stands for heavy motorcycles on soft terrain, such as mud, sand, soft asphalt, and the like, has long been recognized and, in fact, a number of suggestions have been made to improve the effectiveness of such side stands. Most prior-art suggestions for improving the effectiveness of side stands have involved placing a plate under a side stand to increase the surface area on which the side stand acts. Such suggestions are described in U.S. Pat. Nos. 4,521,031 to Huth, 4,474,387 to Maranell et al., 3,955,829 to Bussler, 3,970,330 to Norcross, 3,712,640 to Shipman et al., and 3,998,470 to Houston. However, all of the devices described in these patents have serious shortcomings which have prevented the devices from coming into more widespread use. For example, pads such as those described in U.S. Pat. Nos. 4,521,031 to Huth and 4,474,387 to Maranell et al. are often forgotten and left on the ground when a motorcycle operator drives away. Thus, the motorcycle operator encounters an expense in obtaining the pad, but the pad is quickly thereafter lost.

There are a number of prior-art pads which attach to the ends of the side stands themselves, such as are described in U.S. Pat. No. 3,955,829 to Bussler, U.S. Pat. No. 3,970,330 to Norcross, U.S. Pat. No. 3,712,640 to Shipman et al. and U.S. Pat. No. 3,998,470 to Houston. However, the pads of these devices are also often overlooked by operators when they start the motorcycles and they are sometime then vibrated loose from the side stands and lost and/or their relatively large sizes get in the way of operators and/or operating parts of the motorcycles.

Thus, it is an object of this invention to provide a motorcycle side-stand accessory for enhancing the effectiveness of a motorcycle side stand on soft terrain but yet which is not easily lost and does not impede a motorcycle operator or the operation of other motorcycle parts.

It is yet another object of this invention to provide such a motorcycle side-stand accessory which is safe in operation, effective in use, and relatively inexpensive to manufacture.

Yet another object of this invention is to provide such a motorcycle side-stand accessory which can also be used for locking a motorcycle to thereby prevent theft.

SUMMARY

According to principles of this invention, an accessory for enhancing the effectiveness of a motorcycle side stand comprises a thin, relatively flat, metallic plate having one end of a metallic tether attached thereto extending away from the plate for removably fastening the metallic tether to a member of the motorcycle. The metallic tether includes a length-adjusting arrangement for allowing the reduction of slack in the tether extending between the plate and the motorcycle-member fastening point. Thus, a motorcycle operator can park his motorcycle on a soft surface with the metallic plate under his side stand and the metallic tether extending tautly to the motorcycle frame at a position close to the side stand so that when the operator kicks the side stand up he will feel the tether and be reminded that the accessory is present. In the primary embodiment, the length-adjusting means of the metallic tether includes a chain having a clasp at its outer end. Thus, the chain can be doubled over a motorcycle frame member and the clasp attached to an intermediate chain link with the chain being relatively taut between the plate and the motorcycle frame member.

BRIEF DESCRIPTION OF THE DRAWINGS

The foregoing and other objects, features, and advantages of the invention will be apparent from the following more particular description of the preferred embodiment as illustrated in the accompanying drawings in which reference characters refer to the same parts throughout the various views. The drawings are not necessarily to scale, emphasis instead being placed upon illustrating principles of the invention.

DESCRIPTION OF THE PREFERRED EMBODIMENT

Figure 2:
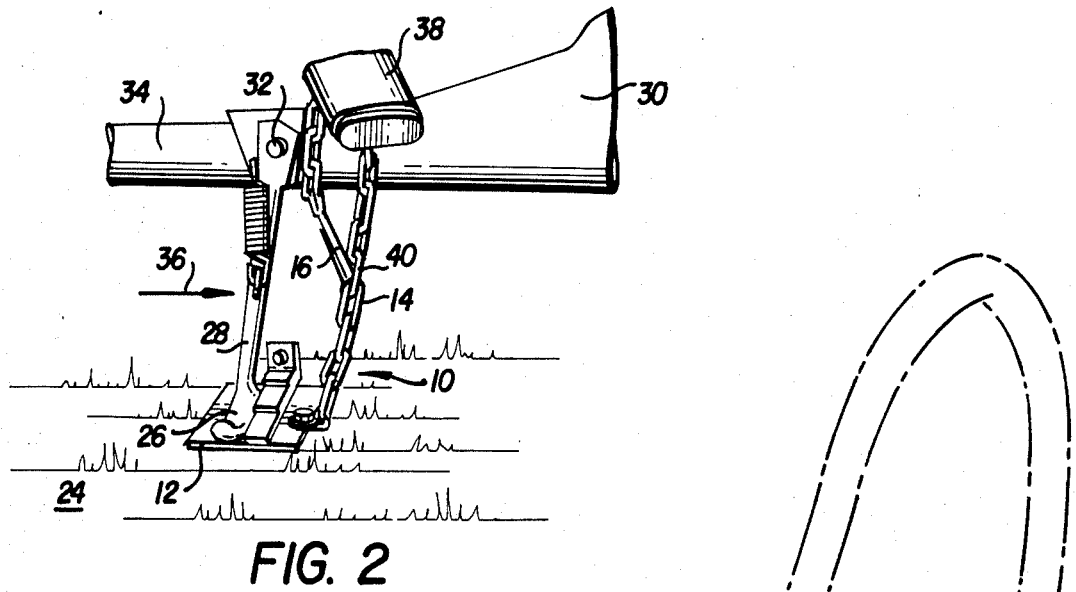
Figure 1:
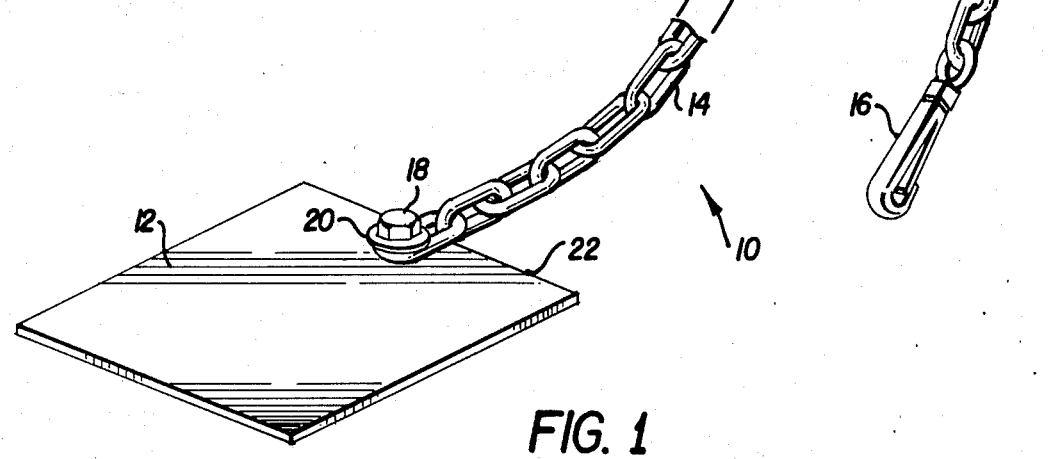
FIG. 1 is an isometric view of a motorcycle side-stand accessory of this invention; and, FIG. 2 is an isometric partial view of a portion of a motorcycle frame with the accessory of this invention shown attached to the frame and having its plate under the motorcycle's side-stand.

Referring now to the drawings, a motorcycle side-stand accessory 10 includes a flat steel plate 12, an 18 inch steel chain 14 and an aluminum spring clasp 16. The steel chain 14 is attached to the flat steel plate 12 by means of a one-half inch long, 5/16 inch self tapping bolt 18 and a 5/16 inch washer 20.

The flat plate 12 is a 3-½ inch×3-½ inch plate cut from 3/16 inch sheet steel stock. Prior to assembly, a starter hole (not shown) is made at a point close to an edge 22 of the plate 12 in which the self tapping bolt 18 is screwed to cut its own threads.

The chain 14 is constructed of 3/16 inch thick welded links.

The spring clasp 16 is of a size such that it can be engaged with the links of the chain 14 as is depicted in FIG. 2. Also, the clasp 16 is particularly constructed of aluminum so as to be frangible and thereby automatically release its grip on a chain link should an unusual amount of force be placed upon the side-stand accessory 10.

Describing now operation of the side-stand accessory 10 with reference to FIG. 2, the plate 12 is placed on marshy terrain 24 and the outer end 26 of a side stand 28 of a motorcycle 30 is placed thereon to support the motorcycle 30 when the motorcycle is leaned sideways against the side stand 28. The side stand 28 is pivotally attached at 32 to a motorcycle frame portion 34 so that the side stand 28 is rotatable upwardly and backwardly as indicated by arrow 36 to a position approximately parallel to the motorcycle frame portion 34 when an operator desires to drive the motorcycle 30. The chain 14 is extended tautly about a foot peg 38, as shown in FIG. 2, and doubled back on itself with its clasp 16 being fastened to one of its links 40. Thus, the chain 14 remains taut between the plate 12 and the foot peg 38. The plate 12 increases the effective area of the outer end 26 of the side stand 28 so that the side stand 28 provides sufficient support for the motorcycle 30.

When the operator wishes to again drive his motorcycle 30, he must rotate with his foot the side stand 28 as shown by the arrow 36 to the stored position adjacent the frame member 34 and in doing so, his foot contacts the chain 14 and he is reminded that the side stand accessory 10 is in place and that it must be removed and stored. Should the operator drive away without lifting the side stand 28 (which he should not do under any circumstances, with or without this invention) he will immediately realize that the side-stand accessory 10 is present because it will be dragged on the ground by the chain 14.

With regard to storing the accessory 10, this can be done by wrapping the chain around a motorcycle frame member and attaching it to itself or, as is obvious, by putting it in a motorcycle saddle bag or on the operator's person.

In further use of the side-stand accessory 10, since the chain is 18 inches long, the chain can be used in combination with a padlock (not shown) to lock a motorcycle at a parking place by wrapping it around a motorcycle frame member and a pole or rack, or by extending the chain through motorcycle spokes, or the like.

It will be obvious to those of ordinary skill in the art from the above description that the side-stand accessory of this invention enhances the effectiveness of a motorcycle side stand while always reminding the operator that it is present when the operator is about to drive off. Further, the side-stand accessory of this invention is universal in application in that it can be used with motorcycles of many sizes and shapes.

A major feature of this invention is that the effective length of the chain 14 can be adjusted so that that portion of the chain extending between the plate and the motorcycle frame is taut. In this manner, the chain can be placed near the side stand and also the accessory provides safe operation because the plate 12 is not dangling from a long tether so that it is free to go to the rear wheel or the like. Should the plate somehow get caught in an operative part of the motorcycle, the aluminum clasp 16 will easily bend to release the accessory 10 from the motorcycle frame member.

Thus, the side-stand accessory of this invention is easy and inexpensive to manufacture, is effective in operation, is safe in operation and can be used universally with motorcycles of various sizes and shapes.

It will also be understood by those of oridinary skill in the art that this invention has a dual use as a lock which can be used by the operator for locking his motorcycle at a location.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. a motorcycle accessory for enhancing the effectiveness of a motorcycle side stand by allowing an operator to leave a motorcycle supported by its side stand on a relatively soft terrain surface, said accessory comprising.

a thin, relatively flat, metallic plate having a side face surface area of sufficient size for preventing said plate from being pushed sideways into said soft terrain surface by the weight of said motorcycle acting through said side stand when said plate is between said side stand and said terrain surface;

a metallic tether having one end therof affixed to said plate and having a sufficient length extending away from said plate for removably fastening said metallic tether to a member of said motorcycle other than said side stand when said plate is between said side stand and said terrain surface to support said motorcycle, said metallic tether including a length adjusting means for allowing the reduction of slack in said tether extending between the plate and the motorcycle-member fastening point, so that said tether can be made to extend relatively tautly between said plate and said motorcycle fastening member;

whereby a motorcycle operator can park his motorcycle on a soft surface with a side stand by placing the metallic plate under the side stand and relatively tautly fastening the tether to a member of the motorcycle by extending the tether close to the side stand so that when the operator moves the side stand to a stored position he will feel the tether and be reminded that the accessory is present.

2. A motorcycle assembly as in claim 1, wherein said adjusting means of said metallic tether comprises an elongated chain-like member having loops along its length and a clasp at the outer end of said chain-like member which can be used to attach to the loops of said chain-like member when the chain-like member is doubled back on itself.

3. A motorcycle accessory as in claim 2, wherein said clasp is frangible.

4. A motorcycle accessory as in claim 3, wherein said clasp is constructed of aluminum.

5. A motorcycle accessory as in claim 3, wherein said affixation of said tether to said plate is close to the edge of said plate.

6. A motorcycle accessory as in claim 5, wherein said tether is attached to said plate by means of a self tapping bolt.

7. A motorcycle accessory as in claim 2, wherein said affixation of said tether to said plate is close to the edge of said plate.

8. A motorcycle accessory as in claim 7, wherein said tether is attached to said plate by means of a self tapping bolt.

9. A motorcycle accessory as in claim 1, wherein said affixation of said tether to said plate is close to the edge of said plate.

10. A motorcycle accessory as in claim 9, wherein said tether is attached to said plate by means of a self tapping bolt.

11. A motorcycle accessory as in claim 1, wherein said plate has dimensions which are at least three inches by three inches.

* * * * *